United States Patent [19]
Onorato et al.

[11] Patent Number: 4,814,228
[45] Date of Patent: Mar. 21, 1989

[54] WET SPUN HYDROXYETHYLATED POLYBENZIMIDAZOLE FIBERS

[75] Inventors: Frank J. Onorato, Phillipsburg; Michael J. Sansone, Berkeley Heights; Arthur Schlask, Roselle Park, all of N.J.

[73] Assignee: Hoechst Celanese Corporation, Somerville, N.J.

[21] Appl. No.: 28,354

[22] Filed: Mar. 20, 1987

[51] Int. Cl.$^4$ .............................................. D02G 3/00
[52] U.S. Cl. .............................. 428/398; 210/500.28; 210/500.23; 264/41; 264/183; 264/184; 264/210.8; 428/376
[58] Field of Search .............. 428/364, 392, 397, 398, 428/376; 264/183, 184, 41, 210.8; 210/500.28

[56] References Cited

U.S. PATENT DOCUMENTS

| | | | |
|---|---|---|---|
| 3,851,025 | 11/1974 | Ram | 264/184 |
| 4,599,388 | 7/1986 | Bower et al. | 525/433 |
| 4,734,466 | 3/1988 | Kindler et al. | 525/433 |

Primary Examiner—Lorraine T. Kendell
Attorney, Agent, or Firm—Lynch, Cox, Gilman & Mahan

[57] ABSTRACT

Hydroxyethylated polybenzimidazole fibers are produced by a wet jet/wet spinning or by a dry jet/wet spinning process. A spinning solution of hydroxyethylated polybenzimidazole is extruded vertically downward through a spinneret into a liquid coagulation bath. The resulting fibers have pore sizes ranging from about 5 angstroms up to about 100 angstroms and are quite useful as ultra filters for molecules with a broad range of molecular weight.

17 Claims, No Drawings

WET SPUN HYDROXYETHYLATED POLYBENZIMIDAZOLE FIBERS

BACKGROUND OF INVENTION

1. Field of Invention

This invention relates to substituted polybenzimidazole articles and the process for their production. More particularly the invention relates to hydroxyethylated polybenzimidazole fibers and the process for their production.

2. Prior Art

Polybenzimidazoles are a known class of heterocyclic polymers which are characterized by a high degree of thermal and chemical stability. Processes for their production are disclosed in U.S. Pat. No. Re. 26,065, and U.S. Pat. Nos. 3,313,783, 3,509,108, 3,555,389, 3,433,772, 3,408,336, 3,549,603, 3,708,439, 4,154,919, and 4,312,976. (All patents enumerated hereof are incorporated by reference.)

Fibers produced from polybenzimidazole polymers retain these favorable attributes and can be useful in a broad range of applications. For example, polybenzimidazole filaments have been utilized for electrodialysis, reverse osmosis, and for a wide range of other separatory uses. However, because the pore size of unsubstituted polybenzimidazole fibers is quite small, i.e. less than about 1 angstrom, polybenzimidazole fibers are not useful as filters for molecules having molecular weights greater than about 1000.

Further, although polybenzimidazole polymers are generally resistant to chemical reaction, the imidazole nitrogen-hydrogen bond on the polybenzimidazole polymer is susceptible to reaction under certain conditions.

Polybenzimidazole fibers have been produced by two basic processes. The first is dry spinning, which involves spinning a polybenzimidazole solution through a spinneret into an evaporative chamber. The second is wet spinning wherein the spinning solution is spun through a spinneret either directly into a coagulation bath, "wet jet/wet spinning", or through an air gap into the coagulation bath, "dry jet/wet spinning".

Typical dry spinning procedures are disclosed in U.S. Pat. Nos. 3,584,104 and 3,502,756 while typical wet spinning processes are disclosed in U.S. Pat. Nos. 4,512,894, 4,263,245, 3,851,025, 3,619,453, 3,526,693 and 3,441,640. While the processes and the products produced by these processes vary based on such differences as the composition of the coagulating bath, the denier of the spun fiber, or the structure of the fiber, none of these patents discloses a method for spinning fibers formed from substituted polybenzimidazole polymers, in general, or hydroxyethylated polybenzimidazole polymers, in particular.

While processes for the production of substituted polybenzimidazole fibers have not been disclosed, several processes for the production of substituted polybenzimidazole polymers have been disclosed. For example, U.S. Pat. No. 3,578,644 discloses a process for the production of an hydroxyl modified polybenzimidazole polymer produced by reacting a polybenzimidazole polymer with an omega-halo-alkanol or a 1,2-alkylene oxide in the presence of a basic catalyst such as sodium hydride. However, this reaction process results in the formation of undesirable organic salts as a by-product; requires a pressurized vessel for the reaction; and the types of polybenzimidazole polymers which can be used in this reaction are limited. For example, such polybenzimidazole polymers as poly-2,2'(m-phenylene)-5,5'-bibenzimidazole and other similarly structured polybenzimidazole polymers may not be used because the bridging groups between the reactive imidazole rings are sterically hindered, thereby severely restricting the reactivity of the imidazole nitrogens. Further, the '644 patent fails to disclose any process for the production of hydroxyl modified polybenzimidazole fibers, membranes or other shaped articles.

An additional process for the production of hydroxyl modified polybenzimidazole is disclosed in U.S. Pat. No. 4,599,388.

Further processes for the production of substituted polybenzimidazoles are disclosed in U.S. Pat. Nos. 4,579,915, 4,377,546, 3,943,125 and 3,518,234. U.S. Pat. No. 4,579,915, discloses substituted polybenzimidazole polymers wherein the imidazole hydrogen is replaced by an aromatic substituent corresponding to the formula:

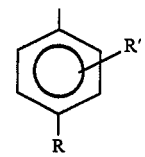

where R is nitro, cyano, or trifluoromethyl and R' is hydrogen, alkyl, nitro, cyano or trifluoromethyl.

U.S. Pat. No. 4,377,546 discloses a phenol substituted polybenzimidazole but does not disclose a process for its preparation.

U.S. Pat. No. 3,943,125 discloses a broad range of substituted tetraamino heterocyclic compounds useful in the preparation of substituted polybenzimidazoles. However, the patent fails to disclose hydroxyethylated polybenzimidazole polymers or a process for the production of hydroxyethylated polybenzimidazole articles.

U.S. Pat. No. 3,518,234 discloses N-aryl substituted polybenzimidazole polymers but, again, fails to disclose hydroxyethylated polybenzimidazole polymers or a process for the production of hydroxyethylated polybenzimidazole articles.

Accordingly, it is an object of the present invention to prepare hydroxyethylated polybenzimidazole fibers.

It is a further object of this invention is to prepare hydroxyethylated polybenzimidazole fibers that exhibit a high degree of chemical and thermal stability.

It is a further object of this invention to prepare hydroxyethylated polybenzimidazole ultra filters which can filter a broad range of molecular weight compounds.

These and other objects, as well as the scope, nature, and utilization of the process will be apparent from the following description and the appended claims.

SUMMARY OF INVENTION

In accordance with the present invention there is provided an hydroxyethylated polybenzimidazole fiber which is prepared by the following process:

a. forming a solution of a polybenzimidazole polymer;

b. reacting the polybenzimidazole polymer with an ethylene carbonate to form an hydroxyethylated polybenzimidazole polymer solution;

c. extruding the hydroxyethylated polybenzimidazole polymer solution through a spinneret; and d. coagulating the hydroxyethylated polybenzimidazole polymer solution in a coagulation bath to form hydroxyethylated polybenzimidazole fibers.

The fibers produced by this process can be utilized as separatory media for such uses as ultra filters which exhibit a broad range of molecular weight cut offs. They may also be used for the production of high strength, chemically resistant, separatory articles where the relatively large micropore size of the articles would be useful.

DETAILED DESCRIPTION OF INVENTION

A. The Starting Material

The polybenzimidazole starting materials are a known class of heterocyclic polymers which are characterized by a recurring monomer unit which corresponds to the following Formula I or II. Formula I is:

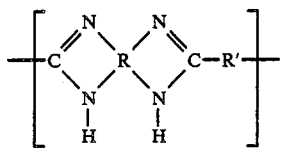

where R is a tetravalent aromatic nucleus with the nitrogen atoms forming the benzimidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing from about 2 to about 20 carbon atoms, such as ethylene, propylene, butylene, cyclohexylene, phenylene, pyridine, pyrazine, furan, thiophene, pyran, and the like.

Formula II corresponds to the structure:

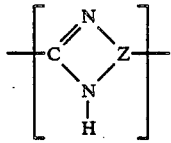

where Z is an aromatic nucleus having the nitrogen atom forming the benzimidazole ring paired upon adjacent carbon atoms of the aromatic nucleus.

The above illustrated polybenzimidazoles can be prepared by various known processes, as described in the Background of Invention section.

The following generalized equation illustrates the condensation reaction which occurs in forming the polybenzimidazoles having the recurring units of Formula I.

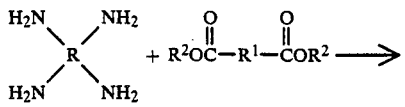

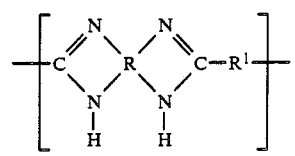

Such polybenzimidazoles are produced by the reaction of a mixture of (1) at least one aromatic tetraamine containing two groups of amine substituents, the amine substituents in each group being in an ortho position relative to each other, and (2) at least one dicarboxylate ester in which $R^1$ and $R^2$ in the compounds shown are substituents selected from aliphatic, alicyclic and aromatic groups.

Examples of polybenzimidazoles which have the recurring structure of Formula I include:
poly-2,2'-(m-phenylene)-5,5'-bibenzimidazole;
poly-2,2'-(pyridylene-3",5")-5,5'-bibenzimidazole;
poly-2,2'-(furylene-2",5")-5,5'-bibenzimidazole;
poly-2,2'-(naphthalene-1",6")-5,5'-bibenzimidazole;
poly-2,2'-(bihenylene-4",4")-5,5'-bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2',2"-(m-phenylene)-5',5"-di(benzimidazole)-propane-2,2; and
poly-2,2'-(m-phenylene)-5',5"-di(benzimidazole)-ethylene-1,2.

The preferred polybenzimidazole of Formula I is poly-2,2'-(m-phenylene)-5,5'-bibenzimidazole as characterized by the recurring monomeric unit:

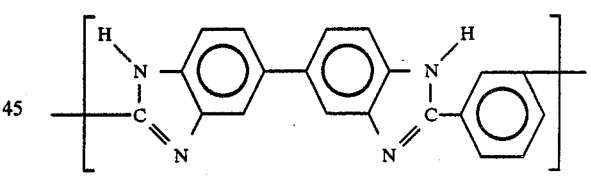

The polybenzimidazoles having the recurring monomer unit of Formula II can be prepared by the autocondensation of at least one aromatic compound having a pair of amine substituents in an ortho position relative to each other and a carboxylate ester group positioned upon an aromatic nucleus. Examples of such compounds are esters of diaminocarboxylic acids which include 3,4-diaminonaphthalene acid; 5,6-diaminonaphthalene-1-carboxylic acid; 5,6-diamino-naphthalene-2-carboxylic acid; 6,7-diaminonaphthalene-1-carboxylic acid; 6,7-diaminonaphthalene-2-carboxylic acid;, and the like. A preferred compound is 4-phenoxycarbonyl-3',4'-diaminodiphenyl ether:

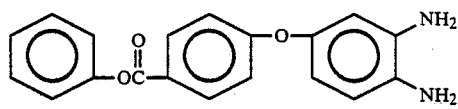

The polymer obtained with 4-phenoxycarbonyl-3',4'-diaminodiphenyl ether is poly-5-(4-phenyleneoxy)benzimidazole.

A polybenzimidazole starting material for the present invention process typically will exhibit an inherent viscosity between about 0.1 and about 1.0 dl/g when measured at a concentration of 0.4 g of said polybenzimidazole in 100 ml of 97 percent sulfuric acid at 25° C.

The weight average molecular weight of a typical polybenzimidazole starting material will be in the range between about 1000 and about 100,000.

B. The Carbonate Reaction

The above polybenzimidazole starting material is reacted with a cyclic carbonate in an organic solvent medium to produce the desired hydroxyethylated polybenzimidazole polymer. The cyclic carbonate is of the following general formula:

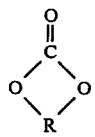

wherein R is a $C_2$-$C_6$ alkyl group. One or more of the alkyl sites may be substituted by a monovalent member selected from the group consisting of hydrogen, alkyl, substituted alkyl, aryl or substituted aryl substituents. In a preferred embodiment the cyclic carbonate is an ethylene carbonate, and one or both of the alkyl sites on the ethylene carbonate may be substituted by a monovalent member selected from the group consisting of hydrogen unsubstituted alkyl, substituted alkyl, aryl or substituted aryl substituents. In a preferred embodiment the alkyl sites are unsubstituted.

The carbonate reactant can be employed essentially in any molar quantity with respect to the polybenzimidazole starting material to produce various percentages of substitution. Preferably, the carbonate reactant is employed in at least a stoichiometric quantity with respect to the reactive imidazole hydrogen sites on the polybenzimidazole polymer. In a preferred embodiment, the ratio of carbonate reactant groups to each reactive imidazole group is from about 10 to about 20 to 1. It is desirable to achieve at least about a 20 percent substitution of the reactive imidazole hydrogen sites with the hydroxyalkyl group. In a preferred embodiment, substitutions of at least about 50 to 70 percent should be obtained.

The hydroxyalkylation reaction between the cyclic carbonate and polybenzimidazole typically is conducted at a temperature between about 30° C. and about 225° C. for a reaction period between about 0.5 and about 24 hours. The reaction can be accomplished conveniently at ambient pressures. In a preferred embodiment the reaction is conducted at a temperature between about 145° C. and about 210° C. for about 3 to about 5 hours.

The concentration of the polybenzimidazole and cyclic carbonate reactants in the organic solvent reaction medium is limited only by the solubility of the polybenzimidazole in the solvent. Generally, the polybenzimidazole concentration in the organic solvent medium will be in the range between about 1 to about 30 percent by weight, based on the total weight of the reaction solution. The molecular weight of the polybenzimidazole is a factor in determining the maximum solute weight of the polymer in the organic solvent reaction medium. In a preferred embodiment polybenzimidazole dopes of about 15 to about 25 percent by weigh based on the total solution weight are used.

Organic solvents suitable for purposes of the present invention include N,N-dimethylformamide, N,N-dimethylacetamide, dimethylsulfoxide, N-methyl-2-pyrrolidone, and the like with the preferred solvent being N,N-dimethylacetamide.

When unsubstituted ethylene carbonate is used as a reactant, the substituted polybenzimidazole produced is hydroxyethylated polybenzimidazole according to the following reaction scheme:

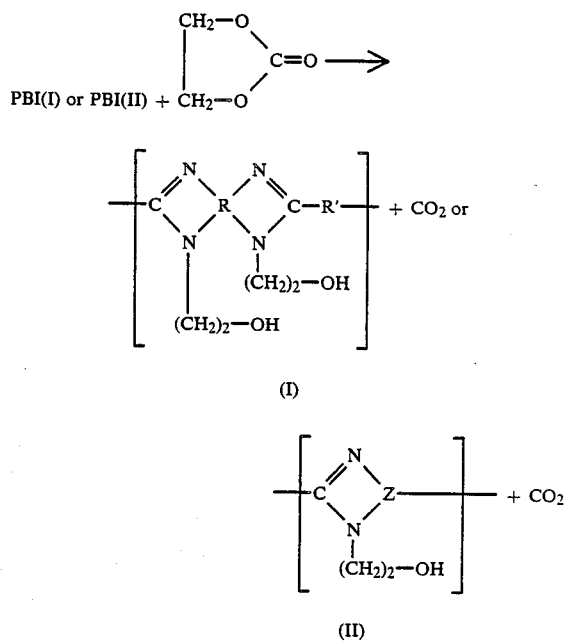

The (I) and (II) repeating units correspond to the Formula I and Formula II structures as previously defined.

After the reaction process is completed, the hydroxyalkyl substituted polybenzimidazole can be recovered by any conventional procedures, such as by vacuum distillation of the solvent medium to provide a residual polymeric solid, or by precipitation of the polymer from the solvent medium by addition of a non-solvent such as acetone, methanol or hexane. The substituted polybenzimidazole polymer of the present invention can also be spun into fibers or cast into membranes.

C. Fiber Formation

To prepare the hydroxyethylated polybenzimidazole fibers, the hydroxyethylated polybenzimidazole polymer prepared by the proceeding procedure is mixed with a solvent to produce a spinning solution. Although the amount of hydroxyethylated polybenzimidazole polymer solids which can be used is dependent upon the viscosity and molecular weight of the particular hydroxyethylated polybenzimidazole polymer, polymer concentrations in the range of about 1 to about 30 percent, by weight based on the total solution weight, are typically used, with polymer concentrations in the range of about 20 to about 30 percent preferred. A minor amount of lithium chloride may also be added to prevent phase separation (i.e. about 1 to about 5 percent by weight based on the weight of the hydroxyethylated polybenzimidazole in the solution). Suitable solvents for preparation of the spinning solution include those solvents which are commonly used in preparing the polybenzimidazole polymer solution for reaction with ethylene carbonate including N,N-dimethylformamide, N,N-dimethylacetamide, dimethylsulfoxide, and N-methyl-2-pyrrolidone, with N,N-dimethylacetamide being the preferred solvent.

The viscosity of the hydroxyethylated polybenzimidazole polymer solvent solution can range from about 200 to about 2500 poises at 30° C. because of the variations in percentage of substitution of the hydroxyethylated polybenzimidazole polymer and the molecular weight of the particular hydroxyethylated polybenzimidazole polymer. In selecting the hydroxyethylated polybenzimidazole dope to be used, it is desirable that the dope have the highest possible viscosity which can still easily be extruded under the desired extrusion conditions. In addition to variations in the fibers caused by different viscosities and percentages of solid content, the characteristics of both the spinning solution and the resulting spun fibers will also vary considerably depending on the percentage of substitution of the precursor hydroxyethylated polybenzimidazole polymer. Useful filaments are produced from hydroxyethylated polybenzimidazole polymers wherein the substitutions are greater than about 20 percent. In a preferred embodiment, a 50 to 70 percent substituted hydroxyethylated polybenzimidazole spinning solution is used.

Using conventional equipment and techniques, a spinning solution of the hydroxyethylated polybenzimidazole is placed in an extrusion or spinning bomb. The bomb, containing the spinning dope, is attached to a conventional spinneret and is pressurized with sufficient pressure to cause the polymer solution contained in the bomb to escape through the spinneret jet. It is, of course, understood that in order to prepare optimum fibers, the dope placed in the bomb should be filtered either prior to placing it in the bomb or just prior to spinning.

The hydroxyethylated polybenzimidazole polymer is preferably introduced and maintained in the spinning bomb at about room temperature (i.e. from about 15° C. to about 35° C.) The spinning solution is extruded through a plurality of extrusion orifices (any reasonable number of orifices from 1 to several hundred is acceptable). The orifices of the present invention can have a diameter of from approximately 20 to 500 microns.

The fibers may be spun through conventional extrusion orifices to produce solid, non-hollow fibers or, in an alternative embodiment, the fibers may be hollow. The spinneret through which the hollow fibers are spun is referred to as a concentric hollow jet spinneret, and is comprised of an inner nozzle and a concentric outer nozzle arranged about the inner nozzle. In order to maintain the hollow configuration of spun fibers during the spinning process, a fluid, either gaseous or liquid, is forced through the inner nozzle at a pressure of about 15 p.s.i. Examples of this fluid include nitrogen and ethylene glycol. The hollow hydroxyethylated polybenzimidazole fibers produced in the present process commonly have an outer diameter of about 50 to about 500 microns and an inner diameter of about 20 to about 350 microns. In a preferred embodiment, hollow hydroxyethylated polybenzimidazole fibers produced in the present process have an outer diameter of about 130 to 300 microns and a wall thickness of about 40 to 90 microns.

As the hydroxyethylated polybenzimidazole polymer is spun, it is fed into a coagulation bath. Although the filaments can be spun directly into the coagulation bath by locating the spinneret within the coagulation bath, it is preferred to expose the as-spun fibers to a gaseous environment to effect partial surface coagulation by allowing them to drop freely for a short distance prior to entering the coagulation bath. The distance between the face of the spinneret and the coagulation bath, known as the "air gap", may influence the composition of fibers. For example, large air gaps increase the amount of surface coagulation. Air gaps suitable for use in the present invention range from approximately $\frac{1}{8}$ inch to about 10 inches and preferably from approximately $\frac{1}{2}$ inch to about 5 inches. When using this dry jet/wet spinning method, the gaseous atmosphere through which the fibers are spun may be composed of any dry inert gas such as nitrogen, the noble gases such as argon, steam, combustion gases such as carbon dioxide, with nitrogen as the preferred gas. The temperature of the gaseous atmosphere will depend on the extent of coagulation of the fibers desired during the air gap drop. When a high temperature gaseous atmosphere is used (i.e. above about 150° C.), the coagulation of as-spun fibers occurs rapidly and a barrier layer may form on the surface of the fiber reducing its porosity. Accordingly, in a preferred embodiment, the temperature of the gaseous atmosphere is maintained at about 55° C. to about 120° C.

Vapors from the coagulation bath may also be introduced into the gaseous atmosphere of the column to prevent the formation of a barrier layer and enhance pore formation on the surface of the fibers. If vapors are used, at some point the temperature of the surface of the as-spun fibers must be less then the dew point of the non-solvent vapor within the column. This allows the vapors to condense on the surface of the as-spun fibers and enhance the microporosity of the fibers.

After extrusion, the filaments are passed through a liquid coagulation bath. The coagulation bath may include any of the non-solvent coagulants commonly used in the coagulation baths for unsubstituted polybenzimidazole fibers such as water, ethylene glycol and sulfuric acid, either alone or in combinations. Additional acceptable non-solvent coagulants may include any of the $C_1$ to $C_6$ alkyl alcohols, such as methanol. In addition, certain solvents for the hydroxyethylated polybenzimidazole such as N,N-dimethylacetamide may be included in the coagulation bath. By varying the composition of the coagulating bath, the average pore size of the fiber can be requested. For example, when higher percentages of water are used in the coagulating bath, the average pore sizes on the surface of the as-spun fibers may be as small as 5 angstroms. However, by adding to the coagulating bath up to about 40 percent of a solvent for the hydroxyethylated polybenzimidazole, the average pore size on the surface of the as-spun hydroxyethylated polybenzimidazole fibers increases to about 100 angstroms. Coagulation baths containing percentages of a solvent for hydroxyethylated polybenzimidazole above about 40 percent fail to adequately coagulate the as-spun hydroxyethylated polybenzimidazole into well formed fibers. In a preferred embodiment the coagulation bath is comprised of at least about 60 percent, by weight based upon the total weight of the bath, of a non-solvent for the hydroxyethylated polybenzimidazole polymer and about 0 to about 40 percent, by weight based upon the total weight of the bath, of a solvent for the hydroxyethylated polybenzimidazole polymer, and most preferably 60 percent methanol and 40 percent N,N-dimethyl acetamide.

Although a wide range of bath temperatures may be employed, an increase in the microporosity of the fibers occurs when the temperature of the bath is maintained above that normally used for the coagulation of smooth skin, unsubstituted, polybenzimidazole fibers. Bath temperatures ranging above about 25° C. and preferably above about 45° C. up to the boiling point of the coagulant, and more preferably from about 45° C. to about 55° C., will assist in the formation of micropores in the hydroxyethylated polybenzimidazole fibers. By carefully controlling both the composition of the coagulation bath and the temperature of the coagulation bath, the size of the micropores in the hydroxyethylated polybenzimidazole fibers can be closely controlled. For example, if an hydroxyethylated polybenzimidazole fiber with pore sizes ranging from about 1 angstrom to about 10 angstrom is desired, the coagulation bath should principally be comprised of water maintained at a relatively cool temperature of about 15° C. to about 30° C. However, if larger size pores are desired, for example, above about 70 angstroms, the coagulation bath should be comprised of about 25 to about 40 percent a solvent for the hydroxyethylated polybenzimidazole, such as N,N-dimethylacetamide, and the temperature of the coagulation bath should be maintained above about 45° C. and preferably from about 45° C. to about 100° C.

During the coagulation process, a slight flow of the coagulant is continually introduced into the coagulation bath to prevent a build up of the solvent which has been removed from the extruded filament.

During the spinning process the fibers may be drawn at a draw ratio of about 1.2:1 to about 3:1 while dropping through the air gap. Further drawing may occur while the fibers are being passed through the coagulation bath. The total draw ratio during spinning and coagulation can range from approximately 1.5:1 to about 50:1, with a preferable total draw ratio of about 2:1 to about 10:1.

The hydroxyethylated polybenzimidazole fibers may additionally be heat drawn after coagulation. If the filaments are heat drawn, it is preferably accomplished by passing the dry fibers through a drawing furnace at temperatures of approximately 400° C. to about 500° C. for about 1 to 5 minutes. The tension on the filament is maintained so that the total heat draw ratio is approximately 1:5 to 1 to about 10:1.

D. Post Coagulation Treatment

The coagulated fibers leaving the coagulation bath are next passed to a washing zone. The continuous length of the hydroxyethylated polybenzimidazole fibers is washed to remove, at least, the major portion of the residual spinning solvent. Typically a simple warm water washing is employed; however, if desired, other wash materials such as acetone, methanol, methylethyl ketone and similar solvent miscible, organic solvents may be used in place of or in combination with warm water. Although a wide range of temperatures may be employed, in the bath, the wash liquid is preferably provided at a temperature of approximately 55° C. to about 65° C.

If desired, the hydroxyethylated polybenzimidazole fibers may be annealed. The annealing process may increase the tightness of the fibers and broaden the cut off range of molecular weights of the fibers. If the fibers are annealed, they may be annealed using any conventional annealing process for unsubstituted polybenzimidazole fibers, such as is disclosed in U.S. Pat. No. 4,512,894, which is incorporated by reference.

The fibers are collected by any conventional means, with the preferred apparatus being assembled from a D.C. motor, whose speed can be precisely controlled, and a transverse winder. This arrangement provides less tension during take up and permits longer continuous operation without breaking the fibers.

It has been surprisingly discovered that the resulting hydroxyethylated polybenzimidazole fibers formed are significantly different from unsubstituted polybenzimidazole fibers. For example, while the pore size of unsubstituted polybenzimidazole fibers is less than about 1 angstrom, hydroxyethylated polybenzimidazole fibers, depending upon the coagulation bath composition and temperature, are characterized by pore sizes ranging from about 5 angstroms to about 100 angstroms.

Because of the relatively large pore size and the large range of pore sizes that are available, the fibers can be utilized as ultra filters for compounds with a large range of molecular weights. Filters produced from these fibers can have molecular weight cut offs as low as about 1,000 or as high as about 50,000.

Fibers produced by this process may also be used as bioreactors for large molecular weight proteins which are grown on the outer surface of the fibers. These proteins can be fed by nutrient solutions running through the lumen of hollow, hydroxyethylated polybenzimidazole fibers. The nutrients freely flow through the pores of the ultra filter to feed the proteins, while the large molecular weight proteins would be prevented from passing through the pores into the lumen.

The following examples are given as specific illustrations of the invention. All parts and percentages are by weight unless otherwise stated. It should be understood however, that the invention is not limited to the specific details set forth in the examples.

EXAMPLE 1

A polybenzimidazole starting solution was prepared by stirring 100 grams of poly-2,2'-(m-phenylene)-5,5'-bibenzimidazole polymer in particulate form, with 450 grams of N,N-dimethylacetamide and 5 grams of lithium chloride for five hours under argon gas in a 1000 ml stainless steel Hoke bomb at 230° C. The solution was then filtered to remove any residual solids. The solution was transferred to a 3 neck, round bottom flask, fitted with a reflux condenser, a mechanical stirrer, and a thermometer, and 28 grams of 98 percent pure ethylene carbonate were added. The reaction flask was heated to 160° C. and held at that temperature for 5 hours. The solution was then cooled to room temperature and added to 1500 grams of acetone to precipitate out the resultant solids, which were then air dried. Analysis disclosed the presence of 117 grams of hydroxyethylated polybenzimidazole, with a percentage of substitution of about 61 percent.

EXAMPLE 2

100 grams of the 61 percent substituted hydroxyethylated polybenzimidazole particulate produced from the reaction of Example 1 was disolved along with 5 grams of lithium chloride in 295 grams of N,N-dimethylacetamide to form a spinning solution. The spinning solution was placed in a conventional reservoir which was maintained at room temperature, (i.e. about 25° C.) and extruded vertically downwardly through a hollow fiber spinneret, having an outside diameter of 500 μm and an inside diameter of 350 μm. for an angular thickness of 75 μm. The bore diameter was 175 μm. The extruded hydroxyethylated polybenzimidazole polymer was passed through a 1 in. air gap into a conventional 1 meter coagulation bath containing water at a temperature of 30° C. The coagulation bath was continually fed with a slight flow of fresh water to prevent a build up of solvents as the spinning progressed. After coagulation, the fibers were taken up at a speed of 0.64 centimeters per second on a conventional take-up bobbin and immersed in a wash bath containing continuously running warm water (at a temperature of approximately 55° C. to 65° C.) for 10 minutes. The resulting fibers, when tested, exhibited a molecular weight cut off of about 20,000.

As is apparent from these examples, hydroxyethylated polybenzimidazole fibers produced by the instant invention have pore sizes significantly larger than those of unsubstituted polybenzimidazole fibers.

We claim:
1. A porous hydroxyethylated polybenzimidazole fiber with pore sizes ranging from about 5 to 100 angstroms produced by the process comprising the steps of:
    (a) forming a solution of a polybenzimidazole polymer wherein the concentration of the polybenzimidazole in the solution ranges from about 15 to about 25 percent by weight based upon the total weight of the solution;
    (b) reacting the polybenzimidazole polymer with an ethylene carbonate wherein the ratio of the ethylene carbonate reactive groups to the polybenzimidazole imidazole hydrogen sites is at least stoichiometric to form at least about a 20 percent substituted hydroxyethylated polybenzimidazole polymer solution;
    (c) extruding the hydroxyethylated polybenzimidazole polymer solution through a spinneret into a gaseous atmosphere wherein the extrusion orifices of the spinneret are located approximately ⅛ of an inch to about 10 inches above the coagulation bath; and
    (d) coagulating the extruded hydroxyethylated polybenzimidazole solution in a coagulation bath comprised of at least about 60 percent by weight of a non-solvent based upon the total weight of the solution, and from 0 to 40 percent [N,N-dimethylacetamide] by weight of a solvent based upon the total weight of the solution, wherein the coagulation bath is maintained at a temperature of at least 45° C. to form porous hydroxyethylated polybenzimidazole fibers with a pore size of from about 5 to about 100 angstroms.
2. The fibers of claim 1 wherein the polybenzimidazole polymer starting material is characterized by recurring monomeric units of:

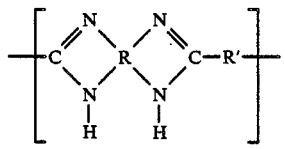

where R is a tetravalent aromatic nucleus with the nitrogen atoms forming the benzimidazole rings being paired upon adjacent carbon atoms, and R' is a divalent substituent selected from aliphatic, alicyclic and aromatic radicals containing between about 2 and 3. The fiber of claim 1 wherein the polybenzimidazole polymer starting material is comprised of recurring monomeric units of:

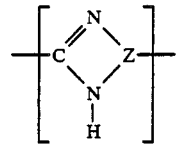

wherein the Z is an aromatic nucleus having the nitrogen atoms forming the benzimidazole ring paired upon adjacent carbon atoms of the aromatic nucleus.

4. The fiber of claim 1 wherein the polybenzimidazole starting material is poly-2,2'(m-phenylene)-5,5'-bibenzimidazole.

5. The fiber of claim 1 wherein one or both of the alkyl sites on the ethylene carbonate is substituted by a monovalent member selected from the group consisting of hydrogen, unsubstituted alkyl, substituted alkyl, aryl or substituted aryl substituents.

6. The fiber of claim 1 wherein the alkyl sites on the ethylene carbonate are unsubstituted.

7. The fiber of claim 1 wherein the ratio of carbonate reactive groups to each reactive imidazole group is from about 10:1 to 20.1.

8. The fiber of claim 1 wherein the ethylene carbonate reaction is conducted at a temperature between about 145° C. and about 210° C. for a period of about 3 to about 5 hours.

9. The fiber of claim 1 wherein from about 50 to about 70 percent of the reactive imidazole hydrogen sites are substituted with hydroxyethyl substituents.

10. The fiber of claim 1 wherein the viscosity of the hydroxyethylated polybenzimidazole polymer solution is from about 200 to about 2500 posies at 30° C.

11. The fiber of claim 1 wherein the concentration of the hydroxyethylated polybenzimidazole formed in the solution is from about 20 to about 30 percent by weight based on the total solution weight.

12. The fiber of claim 1 wherein the hydroxyethylated polybenzimidazole polymer solution contains about 1 to about 5 percent lithium chloride, based upon the weight of the hydroxyethylated polybenzimidazole in the solution.

13. The fiber of claim 1 wherein the non-solvent is selected from a group consisting of water, ethylene glycol, sulfuric acid, $C_1$-$C_6$ alkyl alcohols and combinations thereof.

14. The fiber of claim 1 wherein the non-solvent is $C_1$ to $C_6$ alkyl alcohol.

15. The fiber of claim 1 wherein the solvent in the coagulation bath is comprised of N,N-dimethylacetamide.

16. The fiber of claim 1 wherein it is drawn in a draw ratio from about 2:1 to about 10:1.

17. A porous hydroxyethylated polybenzimidazole fiber wherein the pore size of the fiber ranges from about 5 angstroms to about 100 angstroms.

* * * * *